June 30, 1970  J. D. PROVANCE  3,518,209
SEMICONDUCTIVE GLASSES
Filed July 12, 1967  2 Sheets-Sheet 1
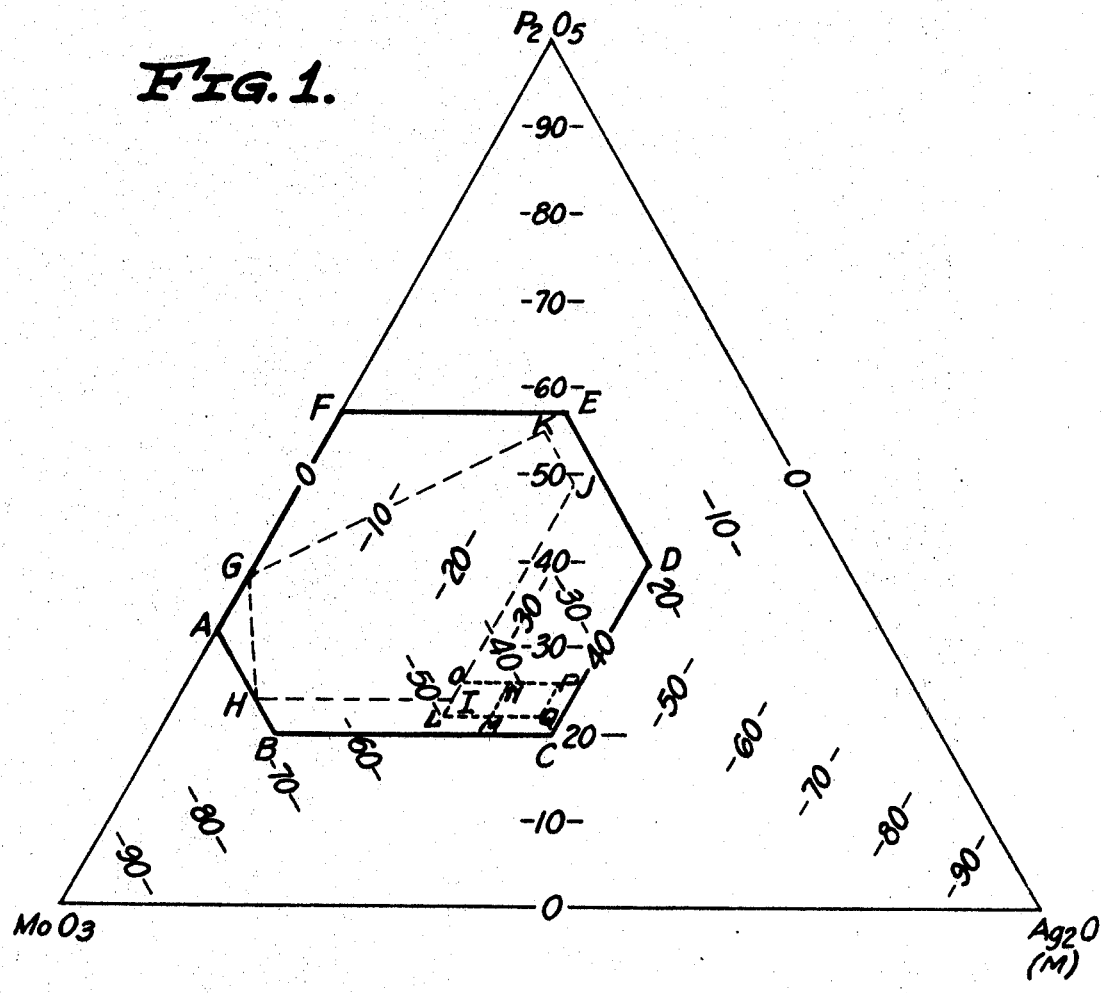
FIG. 1.
INVENTOR
JASON D. PROVANCE
BY
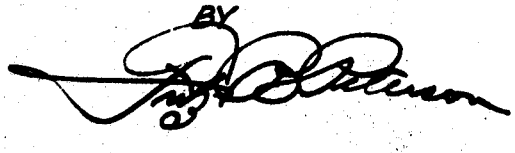

United States Patent Office 3,518,209
Patented June 30, 1970

3,518,209
SEMICONDUCTIVE GLASSES
Jason D. Provance, Glendora, Calif., assignor to Bourns, Inc., a corporation of California
Filed July 12, 1967, Ser. No. 652,974
Int. Cl. C03c 3/00; H01b 1/06
U.S. Cl. 252—521                    16 Claims

ABSTRACT OF THE DISCLOSURE

Glasses characterized by resistivities three orders or more lower than usual glasses, suitable for applications requiring resistivities of the order of from $10^6$ ohm cm. to $10^{10}$ ohm cm. (compared to resistivities of from $10^{13}$ ohm cm. to $10^{15}$ ohm cm. characterizing usual glasses), the glasses having relatively low melting temperatures, and characterized by two types of materials, one type being essentially vitreous and free of dissociated metal particles, the glasses of the first type consisting essentially of fused mixtures of $MoO_3$, $P_2O_5$, and a metal oxide selected from among the group consisting of $Ag_2O$, $CuO$, and $V_2O_5$, the mole percentages being within the ranges of from 20% to 68% $MoO_3$, 20% to 57% $P_2O_5$, and 30% to 0% of oxide of one or more metals selected from among Ag, Cu and V; and the second type being a combination of vitreous and crystalline material consisting essentially of fused mixtures of $MoO_3$, $P_2O_5$, and an oxide selected from among the group consisting of $Ag_2O$, $CuO$, and $V_2O_5$, the mole percentages being within the ranges of from 20% to 68% $MoO_3$, from 20% to 57% $P_2O_5$ and 30% to 40% of the other oxide or oxides selected from among $Ag_2O$, $CuO$, and $V_2O_5$.

---

Figure 2:
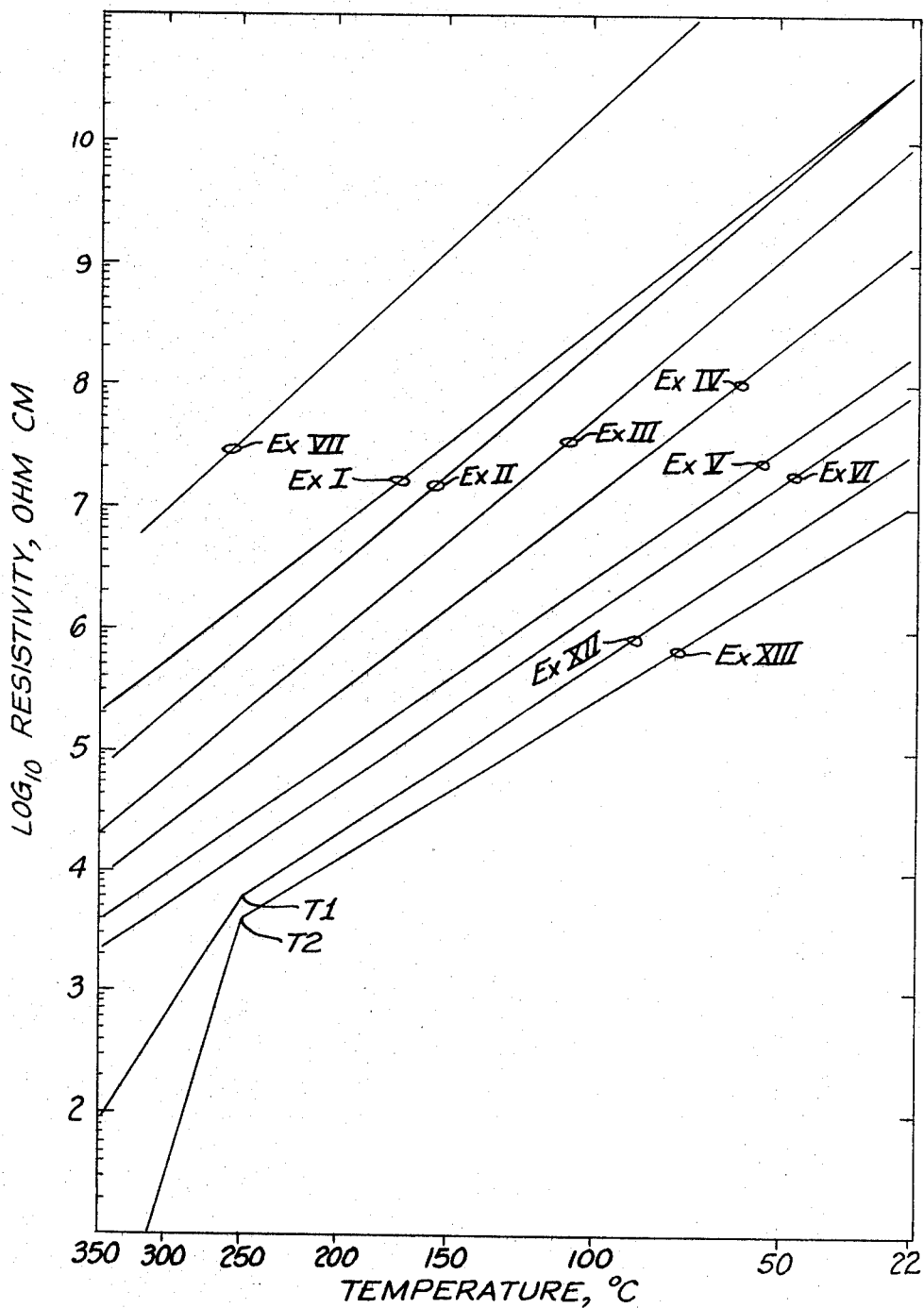

In the prior art it is known to make metaphosphate glasses comprising wolfram oxide or molybdenum oxide, in which glasses metal particles have been reduced from the oxide. However, electrical resistivities of those glasses were left unknown, and remain so. Also it has been known to make glasses comprising binary mixtures of $MoO_3$ with other oxides such as those of Li, Na, K, Ca, Sr, Ba, Pb, Zn, Mn, Al, Bi, P and V. Electrical resistivity of some of the latter was relatively low; and since those glasses were colored, the lowered resistance was apparently due to reduction of oxides into a lower state of oxidation, approaching the metallic state, dispersed through the glasses. Those glasses were also relativley unstable and some thereof devitrified readily. Similarly, binary mixtures of $UO_3$ and other oxides including those of Li, Na, K, Cs, Cu, Mg, Ca, Sr, Ba, Zn, Cd, W and Mo were used in making glasses, with results comparable to those attained with $MnO_3$. Generally, the glasses made with the noted binary combinations were semiconductive, devitrified readily, and were colored. As a consequence of the noted prior art investigations it has been concluded that all oxide glasses are ionic conductors, and that such electronic conduction as has been observed has been surface conduction within a metal formation or film on or near the surface of the glass, formed by surface reduction of oxide to metal.

Also known in the prior art are glasses, termed semiconducting, which are homogenous, single-phased, non-crystalline and in which conduction is by electron (and concluded that all oxide glasses are ionic conductors, and such glasses are characterized by negative coefficient of resistivity. Examples are noted, with complete discussion of modes of preparation, constituents, characteristics and tests, in the technical dissertation contained in pages 211–214 inclusive of the Journal of The American Ceramic Society, vol. 47, No. 5 (May 1964).

The present invention stems from the discovery that semiconducting glassy materials of very low orders of resistivity and characterized by electron transport conduction can be made by utilizing $Ag_2O$ in a three-constituent system including $P_2O_5$ and $MoO_3$. In a first subclass of the glassy materials true glasses entirely free of crystalline structure are obtained, the glasses being semiconductors having volume resistivities of the order of from $5.2 \times 10^{12}$ ohm cm. to $8.6 \times 10^7$ ohm cm. at room temperature (from $3.2 \times 10^6$ ohm cm. to $5.0 \times 10^3$ ohm cm. at 350° C.). In a second subclass of the glassy materials, atomic or colloidal silver particles are dispersed in the glass, the materials or products being characterized by resistivities much lower than in the case of the true glasses of the first subclass. These products have volume resistivities of the order of from $2.9 \times 10^7$ ohm cm. to $1.1 \times 10^7$ ohm cm, at room temperature, the resistivity being drastically lowered at 350° C. to from less than 100 ohm cm. to less than 0.5 ohm cm. The lowering of resistivity is due to formation of metallic silver and migration thereof to the surface of the product at and above about 250° C. This is of importance in respect of this second class of products. It is noted that certain other oxides of good electrical conductors, e.g., of copper and of vanadium, may be used in place of silver oxide, with some restrictions as will hereinafter be made evident. Contrary to previous experience and attempts in which it was found that incorporation of $Ag_2O$ in the glassmaking mix resulted in formation of occlusions of metallic silver, in the present invention silver is usefully used in the materials to grossly reduce resistivity without crystal formation of devitrification, apparently due to the oxygen being readily available from $P_2O_5$ as a result of a P to O ratio of 1:2.

Thus it is a principal aspect of the invention to provide improvements in semiconductive glasses.

Another object is to provide conductive glass in amorphous form comprising silver atoms as conductive material.

Another object is to provide lowered resistivity in a phosphate glass by use of molybdenum and silver oxides. Another object of the invention is to provide a glass capable of reduction to a cellular metallic mass of highly temperature-resistant character.

Another object of the invention is to provide a series of true glass semiconductors.

Another object of the invention is to provide a series of crystallite-containing "glasses" that exhibit semiconductivity up to an elevated temperature at which point a metallic film is formed and the glass thereafter exhibits metallic type electrical conduction.

Other objects and advantages of the invention will hereinafter be set out or made evident in the appended claims and following description of the invention, references being made in the description to the appended drawings which are part of this specification. In the drawings:

FIG. 1 is a composition diagram visually depicting useful composition range boundaries related to glasses of the invention; and FIG. 2 is a temperature/resistivity diagram illustrating the effect of inclusion of silver in the molybdic phosphate glasses in reducing electrical resistivity, and illustrating change of resistivity over a range of temperatures.

Certain groups of the glasses comprised in the invention are, as indicated in the aforestated objectives, extremely useful as base material for production of cellular foam-like metallic or metal products the manufacture of which is fully described, both as to means and methods, in the copending companion application for Letters Patent of Jason D. Provance and Marvin L. Simkins, entitled, "Metallic Products and Process," Ser. No. 652,952, filed contemporaneously with the present application and assigned to the same assignee. The disclosure comprised in the latter application may be referred to for further details in respect of the cellular metallic products produced from glasses herein disclosed, and that disclosure is incorporated herein by reference to the extent required for a full understanding of such use of glasses of the present invention. Also the glasses are useful in production of cermet film resistors and resistance elements; and, in the case of the products containing crystallites, are useful as temperature-sensing and temperature-indicating elements.

In the following tables, mole percentages of component oxides, and resistivities at 25° C., 200° C., and 350° C., are tabulated with respect to a plurality of exemplary glasses within the scope of the invention, whereby comparisons and contains relative to conventional glasses are facilitated.

In the tabulations are contained data relating to fifteen exemplary glassmaking compositions and resistivity data

TABLE I

Molybdic Phosphate Semiconductive Glasses

| Mole, percent | I | Ia | Ib | II | III | IV | V | VI | VII | VIII | IX | X | XI | XII | XIII |
|---|---|---|---|---|---|---|---|---|---|---|---|---|---|---|---|
| $P_2O_5$ | 24 | 24 | 24 | 24 | 24 | 24 | 24 | 24 | 38 | 32 | 40 | 48 | 23 | 24 | 24 |
| $MoO_3$ | 68 | 68 | 68 | 64 | 60 | 56 | 52 | 48 | 62 | 40 | 32 | 24 | 55 | 44 | 40 |
| $Ag_2O$ | 8 | | | 12 | 16 | 20 | 24 | 28 | | 28 | 28 | 28 | 22 | 32 | 36 |
| $CuO$ | | 8 | | | | | | | | | | | | | |
| $V_2O_5$ | | | 8 | | | | | | | | | | | | |

Amorphous (vitreous) — columns I through X; Nonvitreous — columns XI through XIII Log Resistivity (Base 10)

| 25° C. | I | II | V | VIII | XI |
|---|---|---|---|---|---|
| | 10.5 | 10.5 | 8.2 | 7.8 | |
| | Ia | III | VI | IX | XII |
| | 9.3 | 9.9 | 7.9 | 8.4 | 7.5 |
| | Ib | IV | VII | X | XIII |
| | 9.9 | 9.1 | 12.7 | 8.5 | 7.0 |
| 200° C. | I | II | V | VIII | XI |
| | 7.2 | 6.6 | 4.8 | 4.9 | |
| | Ia | III | VI | IX | XII |
| | 6.1 | 5.9 | 4.6 | 4.7 | 4.4 |
| | Ib | IV | VII | X | XIII |
| | 6.6 | 5.3 | 8.3 | 4.4 | 4.1 |
| 350° C. | I | II | V | VIII | XI |
| | 5.3 | 4.8 | 3.7 | 3.9 | |
| | Ia | III | VI | IX | XII |
| | 4.6 | 4.3 | 3.6 | 3.7 | 1.9 |
| | Ib | IV | VII | X | XIII |
| | 4.9 | 3.9 | 6.5 | 3.3 | −3.1 |

TABLE II

Resistivity (ohm cm.)

| 25° C. | I | II | V | VIII | XI |
|---|---|---|---|---|---|
| | $3.4 \times 10^{10}$ | $3.3 \times 10^{10}$ | $1.7 \times 10^8$ | $6.2 \times 10^7$ | |
| | Ia | III | VI | IX | XII |
| | $2.1 \times 10^9$ | $9.2 \times 10^9$ | $8.6 \times 10^7$ | $2.5 \times 10^8$ | $2.9 \times 10^7$ |
| | Ib | IV | VII | X | XIII |
| | $7.8 \times 10^9$ | $1.4 \times 10^9$ | $5.2 \times 10^{12}$ | $3.3 \times 10^8$ | $1.1 \times 10^7$ |
| 200° C. | I | II | V | VIII | XI |
| | $1.7 \times 10^7$ | $3.9 \times 10^6$ | $6.2 \times 10^4$ | $7.6 \times 10^4$ | |
| | Ia | III | VI | IX | XII |
| | $1.3 \times 10^6$ | $8.7 \times 10^5$ | $4.4 \times 10^4$ | $2.2 \times 10^4$ | $2.3 \times 10^4$ |
| | Ib | IV | VII | X | XIII |
| | $3.7 \times 10^6$ | $2.0 \times 10^5$ | $2.1 \times 10^8$ | $2.6 \times 10^4$ | $1.4 \times 10^4$ |
| 350° C. | I | II | V | VIII | XI |
| | $1.9 \times 10^5$ | $6.5 \times 10^4$ | $3.5 \times 10^3$ | $8.4 \times 10^3$ | |
| | Ia | III | VI | IX | XII |
| | $3.7 \times 10^4$ | $2.0 \times 10^4$ | $5.0 \times 10^3$ | $5.1 \times 10^3$ | [1] 83 |
| | Ib | IV | VII | X | XIII |
| | $7.7 \times 10^4$ | $8.6 \times 10^3$ | $3.2 \times 10^6$ | $2.3 \times 10^3$ | [1] 05 |

[1] Ohm centimeter.

relative to the products, here termed glasses whether vitreous glasses or glassy products characterized by crystallites and/or surface-borne reduced metal, the resistivity data being specific to resistivities at three widely different temperatures. In the first table, resistivities are set down in terms of volume of resistivity, ($\rho$) ohm-cm. expressed as logarithm of $\rho$, and in the second table the resistivities of the same examples are stated in ohm-cm. to the logarithm base 10.

Referring to the tabulation, the several glasses and the corresponding groups of oxide glassmaking components are each identified by a respective Roman numeral, and each is herein referred to as an example. As is indicated in the tabulation, each of the glassmaking compositions comprises $P_2O_5$, $MoO_3$, and an oxide of a metal selected from Ag, Cu and V and herein denoted by the letter M, silver being the preferred metal of the three. The examples included in the tabulation were selected from among many included within the scope of the invention to illustrate certain features of the glasses. The constituent values in the tabulations are mole or molecular percentages of the three glassmaking constituents comprised in the glass of the respective example.

Among the glasses included in the tabulation, Examples I, Ia, Ib and II through VI and VIII through XI are typically illustrative of molybdic phosphate glasses of vitreous structure comprising silver (or copper or vanadium) oxide in essentially non-nucleated or crystallite-free form as a resistivity-lowering constituent. Examples XII and XIII are nonvitreous glasses in which the silver content is increased beyond the ability of the product to retain in solution all of the silver oxide introduced, some of the latter appearing as metallic crystallites in the glass during the melting process.

In FIG. 1, there is enclosed within a composition-range boundary defined by the polygon GHIJK points representing various mole percentage compositions of vitreous glasses of semiconductive character within the scope of the invention; and within a similarly depicted boundary represented by the polygon ABCDEF but excluding area GHIJK, mole percentage compositions of crystalline or crystallite-containing glasses within the scope of the invention and which glasses exhibit nonvitreous character and some of which exhibit a measure of surface-metal conductivity. Certain compositions represented by points outside polygon GHIJK but within polygon ABCDEF may be hygroscopic to an extent rendering them undesirable for most resistor applications. Points within the boundaries of polygon LMNO outside the polygon GHIJK but within the larger polygon, define glassmaking mixes or compositions of the indicated three oxides, which compositions when heated to glassmaking temperature may be vitreous or may contain crystallites, depending upon the temperature treatment of the glass. Thus, unless cooled very slowly, or reheated and held at a high temperature below the softening temperature sufficiently to permit realignment of atoms and molecules into crystalline form, some glasses will be vitreous as are those defined by points within polygon GHIJK. On the other hand, by either slow cooling from the molten state or by prolonged heat treatment, some glasses may be made to be devitrified, that is, to contain crystallites. An example of such a glass is Example XII of the tabulation.

Further increase of the silver oxide content of the glassmaking mix while holding the $P_2O_5$ content fixed, results in agglomeration of silver atoms with at least some migration of silver to or toward the surface of the glass. Such glasses are illustrated by Example XIII of the tabulation, and are defined generally by points within the polygon MNPQ of FIG. 1.

Referring now to FIG. 2, the resistivities of the glasses of Examples I through VII (the compositions of which glasses are represented by respective points within polygon GHIJK in FIG. 1) and of Examples XII and XIII (the compositions of which are represented by respective points within polygon LOPQ in FIG. 1) are plotted relative to temperature, on logarithmic scales. As is there indicated, the glasses of Examples I through VII show uniform change of the logarithm of resistivity throughout the temperature range from 22° C. to 350° C. However, and significantly, the plots of Examples XII and XIII show a sharp resistivity transition at a temperature of about 250° C. The latter is the temperature at which those preferred examples of crystallite-containing glasses of the invention represented by points within the polygon LOPQ in FIG. 1 become rapidly more surface-conductive, that is, at which a sharp increase in surface-conduction occurs. The physical change which causes the rapid lowering of resistivity is irreversible; hence glasses of the invention, represented by points within polygon LOPQ in FIG. 1, remain surface-conductive when once heated above the transition temperature. The latter is not necessarily the same for all glasses represented by points in the polygon LOPQ. The sharp change of resistivity evidenced at a particular temperature as the temperature is increased is of value as a temperature-indicator or as a resistivity indicator, as will be evident to those skilled in the art. As the temperature of any of the glasses exhibiting the transition effect is raised through the transition temperature, the temperature coefficient of resistivity is reversed in sign, that is, is changed from negative to positive; and that change is similarly irreversible. Glasses exhibiting the resistivity transition are of a variety of percentage compositions each defined by a respective point within the bounds of polygon ABCDEF but outside the bounds of polygon GHIJK in FIG. 1. Thus that class of glasses according to the invention are, below the transition point, semiconductive and characterized by negative temperature coefficient of resistivity (—Tc) and are characterized by sharp increase of rate of change of resistivity with temperature increase at the transition temperature, with irreversible change of sign to Tc.

The glasses according to the invention are those products of the fusion of $MoO_3$, $P_2O_5$ and a metal oxide M selected from the oxides of Ag, Cu and V, which products are rigid and for all practical purposes are nonhygroscopic, and the constituent oxides of which are in mole percentages in each glass defined by respective points within (or on a boundary of) the polygon ABCDEF of FIG. 1. As is evident from consideration of FIG. 2, increase of silver oxide as a constituent from 0% upward to about 40% results in decreasing resistivity. At about 40 mole percent of silver oxide, the practical solubility limits of the glass are reached, and thereabove a portion of the silver, as metal, agglomerates in the melting container bottom making it impractical and difficult to pour or obtain as a reasonably homogeneous material. Also, it is noted that increasing percentages of $P_2O_5$ permit increasing percentages of $Ag_2O$ to be incorporated, within limits, in the glass. However, as the $P_2O_5$ constituent is increased beyond the limits specified in this invention, a tendency of the product to become hygroscopic, even to the point of becoming soft and tacky to the touch, is noted.

Further, increase of the mole percentage of $MoO_3$ in the glassmaking mixture of oxides is found to be limited by ability of the glassy product to retain the molybdenum in an amorphous or crystallite-free system, the molybdenum oxide tends toward formation of crystallites in proportion above about 68 mole percent, agglomerating as a separate material or as a mixture with the silver metallic component. As the $Ag_2O$ component is increased above about 30 mole percent the glassy product tends to contain silver crystallites and tends to devitrify readily, and at about 40% tends toward agglomeration, as previously indicated.

Thus there are determined mole percentage limits or bounds within which the three noted glassmaking constituents may be fused into glass products which in a principal subclass are semiconductive, rigid and nonhygroscopic and which in a subsidiary subclass are rigid but may be at least partially conductive and/or partially hygroscopic. And thus, as indicated in FIG. 1, the practical limits of $MoO_3$ are from about 20% to 68% molecular proportions, of $Ag_2O$ from about 0% to about 40%, and of $P_2O_5$ from about 20% to about 57%. Those limits describe respective sides of the polygon ABCDEF of FIG. 1. It is evident that some mole percentage proportions of the three glassmaking constituents represented by some points within the latter polygon may be hygroscopic at least at the exposed surface of the product, or not rigid in the sense they will slump at room or higher ordinary temperatures during a period of days' duration. Also it is evident that with a high mole percentage of $Ag_2O$ and only a moderate proportion of $P_2O_5$, excessive agglomeration or migration to the surface of free silver may occur, or extreme crystallization, within the composition bounds defined by the polygon. And similarly in the case of high mole percentages of $MoO_3$, with low relative proportions of $P_2O_5$, agglomeration or separation of constituent components may occur during glassmaking fusion. However, within the bounds of glassmaking constituent proportions defined by polygon ABCDEF there are defined innumerable constituent mixes which upon fusion result in glassy products which are electrically semiconductive, at least initially, are rigid, substantially nonhygroscopic, that is, nonhygroscopic for all practical purposes, and are nonagglomerated. Those products are either true amorphous glasses, or glassy products containing nucleated components herein termed crystallites, or such glassy products which upon heating possess thereafter thin surficial films of conductive material.

As has been indicated, points within boundaries defined approximately by the polygon GHIJK of FIG. 1 define respective mole percentage mixtures of the glassmaking constituents which upon fusion together result in true amorphous, nonhygroscopic, semiconductive glasses which are rigid solids when cooled and which collectively cover a wide range of electrical resistivities. As may be determined, the compositions tabulated in the previous tables and set out as Examples I through XI are comprised in the latter polygon. It should be emphasized, however, that polygon GHIJK does not necessarily include all points of the three-phase diagram which represents true amorphous glasses; that is, that points outside that polygon but within the circumscribing polygon ABCDEF also may define respective ones of innumerable mixtures of the three glassmaking constituents which upon fusion result in true amorphous glasses. Also it is clear that within the area exterior to polygon GHIJK but circumscribed by polygon ABCDEF there are points definitive of three-constituent mixes of the noted glassmaking oxides $MoO_3$, $P_2O_5$ and M which, when fused, result in products which are either too hygroscopic, or which become too soft upon exposure to the atmosphere, or which are too agglomerated, for practical purposes in the manufacture of electrical resistive devices.

Also as has been indicated, within the scope of the invention are a multiplicity of fused products each represented by a respective point within the bounds of polygon LMNO (FIG. 1) within the circumscribing outer polygon ABCDEF, and which products include Examples XII and XIII of the tabulated data previously mentioned.

Examination of details of the graphs portrayed in FIG. 2 indicates forcibly the effect of silver oxide in the glassy products of the invention. In that drawing, throughout the temperature range from 22° C. to 350° C., the resistivity of the glass of Example VII is indicated to be more than one order higher than that of any of the other examples. The resistivity indicated for Example VII is substantially that of molybdic-phosphate glass, since the silver content thereof is substantially zero, as set out in Table I. An order of more reduction in resistivity is registered by Example I, the $Ag_2O$ content of which is indicated in the tabulation to be 8 mole percent. Among the exemplary products, the constant-temperature reduction of resistivity with increasing percentage of silver oxide is not linear, as is evident, because of variation of the molybdenum content. However, as is equally evident, a product having a desired resistivity value (within the indicated limits) at a specified temperature, may be produced by fusing proportions of the three constituents as indicated by the three-phase diagram and with reference to FIG. 2.

The preceding detailed disclosure of specific examples of products within the scope of the invention, and of the principles of the invention, indicates complete attainment of the aforementioned objects. In the light of that disclosure, it is obvious that an enormously large number of glassy products may be compounded within the scope of the invention both by small variations in the mole percentage of the constituents $MoO_3$, $P_2O_5$ and M, and by using as metal oxide M different ones of $Ag_2O$, CuO and $V_2O_5$, in each instance selecting mole percentage combinations represented by respective points within the limits defined by the above-identified boundaries and chacteristics. In general, it will be noted that $V_2O_5$ may be substituted for $Ag_2O$ with resultant lower resistivity of the product, as may CuO with a somewhat lower resistivity than $V_2O_5$ or $Ag_2O$. Thus it is not desired to restrict the scope of the invention to details of the specific examples used to illustrate the invention, except as may be required by the appended claims.

I claim:
1. The electrically semiconductive product consisting essentially of the product of fusion of a mixture of three constituents, said mixture consisting of $MoO_3$ as a first constituent, $P_2O_5$ as a second constituent, and a positive amount of a metal oxide M as a third constituent, said metal oxide M selected from among oxides of silver, copper, and vanadium, said three constituents by mole percentages being within the ranges $MoO_3$ from 20% to 68%, $P_2O_5$ from 20% to 57% and metal oxide M from a value in excess of 0% to 40%, said semiconductive product being rigid and substantially nonhygroscopic.

2. A product as defined in claim 1, in which metal oxide M is $Ag_2O$.

3. A product as defined in claim 1, the said product being vitreous.

4. A product as defined in claim 1, the said product containing crystallites.

5. A product as defined in claim 1, in which the mole percentage ranges are $MoO_3$ from 23% to 68%, $P_2O_5$ from 24% to 55%, and M from 8% to 28%, and in which the electrical resistivity of the product is within the range of from about $6.2 \times 10^7$ ohm cm. to about $5.2 \times 10^{12}$ ohm cm. at 25° C. and within the range of from about $2.3 \times 10^3$ ohm cm. to about $3.2 \times 10^6$ ohm cm. at 350° C.

6. A product as defined in claim 5, in which M is $Ag_2O$.

7. An electrical resistor material comprising the product of fusion of a three-constituent mixture consisting of $MoO_3$ as a first constituent, $P_2O_5$ as a second constituent, and a positive amount of a metal oxide M selected from among oxides of silver, copper, and vanadium, said constituents by mole percentages being within the ranges $MoO_3$ from 23% to 68%, $P_2O_5$ from 24% to 55%, and metal oxide M from a value in excess of 0% to 40%, said product being rigid and characterized by electrical resistivity within the range from about $1.1 \times 10^7$ ohm cm. to about $5.2 \times 10^{12}$ ohm cm. at 25° C. and within the range of from about 0.5 ohm cm. to about $3.2 \times 10^6$ ohm cm. at 350° C.

8. An electrical resistor material according to claim 7, in which M is $Ag_2O$.

9. An electrical resistor material according to claim 8, in which the mole percentages of the constituents are $MoO_3$ 68%, $P_2O_5$ 24% and $Ag_2O$ 8%, the said product being characterized by electrical resistivity of the order of $3.4 \times 10^{10}$ ohm cm. at 25° C. and of the order of $1.9 \times 10^5$ ohm cm. at 350° C.

10. An electrical resistor material according to claim 8, in which the mole percentages of the constituents are $MoO_3$ 24%, $P_2O_5$ 48% and $Ag_2O$ 28%, the said product being characterized by electrical resistivity of the order of $3.3 \times 10^8$ ohm cm. at 25° C. and $2.3 \times 10^3$ ohm cm. at 350° C.

11. The electrically semiconductive product consisting essentially of the rigid substantially nonhygroscopic product of fusion of the constituents of a three-constituent mixture consisting essentially of $MoO_3$, $P_2O_5$, and a positive amount of a metal oxide M selected from among oxides of Ag, Cu, and V, said constituents of said mixture being in mole percentage proportions defined by a point within the polygon ABCDEF in the diagram,

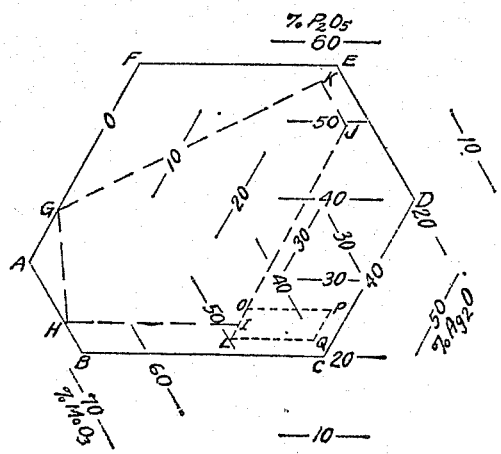

said semiconductive product being selected from among those of said products of fusion which are vitreous and those which contain crystallites.

12. A product according to claim 11, in which the mole percentage proportions of the constituents are defined by a point enclosed in the polygon GHIJK in the diagram and which product is vitreous and semiconductive.

13. A product according to claim 11, which product contains crystallites.

14. A product according to claim 11, in which the mole percentage proportions of the constituents are defined by a point enclosed in the polygon LOPQ in the diagram.

15. A product according to claim 11, which product contains crystallites and is characterized by a positive temperature coefficient of resistivity.

16. An electrically semiconductive glass consisting of the rigid substantially nonhygroscopic product of the fusion of constituents consisting of $MoO_3$, $P_2O_5$ and $Ag_2O$ in mole percentages 44%, 24% and 32%, respectively.

References Cited

FOREIGN PATENTS 761,288   11/1956   Great Britain.
761,289   11/1956   Great Britain.

DOUGLAS J. DRUMMOND, Primary Examiner

U.S. Cl. X.R.

106—47

UNITED STATES PATENT OFFICE
CERTIFICATE OF CORRECTION

Patent No. 3,518,209                                            June 30, 1970

Jason D. Provance

It is certified that error appears in the above identified patent and that said Letters Patent are hereby corrected as shown below:

Column 1, line 65, "concluded that all oxide glasses are ionic conductors, and" should read -- hole) transport rather than by transport of ions; and --. Column 2, line 30, "of" should read -- or --. Column 4, line 6, "contains" should read -- contrasts --. Column 5, line 6, "volume of resistivity" should read -- volume resistivity --. Column 6, line 38, "sign to Tc" should read -- sign of Tc --; line 64, "oxide tends toward" should read -- oxide tending toward --.

Signed and sealed this 12th day of January 1971.

(SEAL)
Attest:

Edward M. Fletcher, Jr.
Attesting Officer

WILLIAM E. SCHUYLER, JR.
Commissioner of Patents